United States Patent Office 2,739,148
Patented Mar. 20, 1956

2,739,148

CYANINE DYES CONTAINING A 3,5-DIARYLPYRROLE NUCLEUS AND PROCESS OF PREPARATION

Kenneth J. Reed, Wealdstone, England, assignor to Eastman Kodak Company, Rochester, N. Y., a corporation of New Jersey No Drawing. Application September 19, 1951, Serial No. 247,381

6 Claims. (Cl. 260—240.5)

This invention relates to new cyanine dyes containing a 3,5-diarylpyrrole nucleus and methods for making them.

Cyanine dyes containing a 3,5-diarylpyrrole nucleus have previously been described in the art. See, for example, Goodings et al U. S. Patent 2,434,039, issued January 6, 1948.

I have now found a new class of 3,5-diarylpyrrole dyes which contain an alkyl group attached to the pyrrole nitrogen atom.

It is, therefore, an object of my invention to provide a new class of 3,5-diarylpyrrolo cyanine dyes. Still another object is to provide methods for making these new dyes. Another object is to provide photographic elements containing my new dyes. Other objects will become apparent from a consideration of the following description and examples.

According to my invention I provide 3,5-diarylpyrrolo cyanine dyes represented by the following general formula:

I 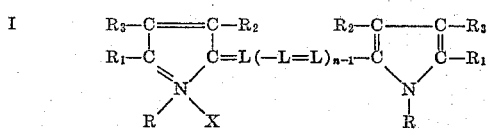

wherein R represents an alkyl group, such as methyl, ethyl, n-propyl, n-amyl, n-heptyl, n-dodecyl (lauryl), stearyl, benzyl (phenylmethyl) phenylethyl, etc. (e. g. a primary alkyl group containing from 1 to 18 carbon atoms) or a cycloalkyl group, such as cyclopentyl, cyclohexyl, etc. (e. g. a cycloalkyl group containing from 5 to 6 carbon atoms), $R_1$ and $R_2$ each represents an aryl group, such as phenyl, p-chlorophenyl, p-methoxyphenyl, p-ethoxyphenyl, m-nitrophenyl, sulfonated phenyl, hydroxyphenyl, α- and β-naphthyl, etc. (e. g. a mononuclear aryl group of the benzene series), $R_3$ represents a hydrogen atom, an alkyl group (such as those set forth above for R, for example), or an aryl group (such as those set forth above for $R_1$ and $R_2$, for example), L represents a methine group (substituted or unsubstituted), $n$ represents a positive integer of from 1 to 3, and X represents an anion, such as chloride, bromide, iodide, perchlorate, sulfamate, sulfate, thiocyanate, methylsulfate, ethylsulfate, benzenesulfonate, p-toluenesulfonate, xylenesulfonate, formate, acetate, etc.

The monomethine cyanine dyes of my invention represented by Formula I above (wherein $n$ is 1) can be prepared by condensing a pyrrole base selected from those represented by the following general formula:

II 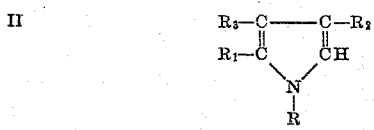

wherein R, $R_1$, $R_2$ and $R_3$ each have the values set forth above with formic acid (see my copending application S. N. 247,382, filed on even date herewith, now U. S. Patent 2,725,378, issued November 29, 1955), formaldehyde, a diarylformamidine (e. g. di-phenylformamidine, di-p-tolylformamidine, etc.), a trialkyl orthocarboxylate (e. g. triethyl orthoformate, triethyl orthoacetate, etc.), benzotrichloride (gives dyes where L is = $C(C_6H_5)$—), and halides of monocarboxylic acids (e. g. acetylchloride (L is=$C(CH_3)$—), benzoyl chloride (L is=$C(C_6H_5)$—), etc.).

The intermediates represented by Formula II above can be prepared by double decomposition of the sodium or potassium salts of the pyrrole bases represented by the following general formula:

III 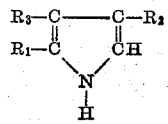

with a cycloalkyl or alkyl halide (RX′, wherein R has the values set forth above and X′ represents a halogen atom). Pyrrole bases selected from those represented by Formula III above have been previously described in U. S. Patent 2,434,039 mentioned above and by Rogers et al. "J. Chem, Soc.," 1943, p. 590.

The carbocyanine dyes of my invention (wherein $n$ in Formula I above is 2) can advantageously be prepared by condensing a pyrrole base selected from those represented by Formula II above with a compound selected from those represented by the following general formula:

IV $\quad R_4$—O—CH=CH—CH($OR_5$)$_2$ wherein $R_4$ and $R_5$ each represents an alkyl group such as methyl, ethyl, etc. (e. g. an alkyl group containing from 1 to 2 carbon atoms).

The dicarbocyanine dyes of my invention (wherein $n$ in Formula I above is 3) can advantageously be prepared by condensing a pyrrole base selected from those represented by Formula III above with alkali metal glutaconic dialdehydes (e. g. monosodium glutaconic dialdehyde, monopotassium glutaconic dialdehyde, etc.) or acyl glutaconic dialdehydes (e. g. monoacetyl glutaconic dialdehyde, monobenzoyl glutaconic dialdehyde, etc.). The condensations are advantageously effected in strongly acid media, such as in sulfuric acid, phosphoric acid, etc.

Advantageously, the above condensations can be carried out in the presence of an inert solvent, such as methanol, ethanol, 1,4-dioxane, etc. The condensations can be accelerated with heat, although temperatures varying from room temperature to the steam bath can be used. Advantageously, I can heat the reaction mixture under reflux or on a steam bath.

Alternatively, instead of using the acetals represented by Formula IV above in the preparation of my new carbocyanine dyes I can employ the aldehyde itself, or the free aldehydes or diacetals of propargylaldehyde or phenylpropargylaldehyde.

The anion of my new dyes can be varied by methods known to the art. For example, by treating the first-formed dye with an acid stronger than the acid displaced, or by treating with a soluble salt, the anion of which produces a dye more insoluble than the first-formed dye. See, for example, Brooker U. S. Patents 2,245,249 and 2,245,250, both issued June 10, 1941.

The dyes of the instant invention are useful coloring matters and have been found to be particularly useful for the preparation of light-screening layers in photographic elements, especially elements carrying sensitive silver halide layers. The dyes can be used in backing or anti-halation layers either alone or in combination with other dyes, or in light filter layers overlying one or more light-sensitive layers or between two light-sensitive layers. Many of the dyes are inert photographically and are rapidly bleached or destroyed by the alkaline photographic developing solutions normally used in processing exposed photographic layers to a visible image.

For the preparation of over-coating layers, filter layers or anti-halation layers according to my invention, from 50 mg. to 150 mg. of dye is dissolved in from 2 to 5 cc. of a water-miscible solvent. Methanol or acetone is suitable for this purpose but pyridine or ethylene glycol monoethyl ether can also be used. The solution is then added to about 25 cc. of a 5 percent gelatine solution at 40° C. and the mixture coated on the support. If the iodide salt has been made and this is found to be insufficiently soluble in the water-miscible solvent, it can be converted into the dye chloride by double decomposition in solution in cresol.

The following examples will serve to illustrate more fully the manner whereby I practice my invention.

N-alkylated-2:4-diarylpyrroles can be obtained by conversion of the corresponding 2:4-diarylpyrrole into the N-potassium derivative by treatment with metallic potassium in boiling dioxane. Alkylation is then effected by reaction with the appropriate alkyl iodide.

Thus methyl-, ethyl-, n-propyl- or longer alkyl substituents of diarylpyrroles were obtained by the appropriate modification of the following general method described for n-butyl-2:4-diphenylpyrrole. These pyrroles are high boiling liquids except 1-methyl-2:4-diphenylpyrrole which crystallises in prims from ethanol M. P. 109°.

*1-butyl-2:4-diphenyl pyrrole*

2:4-diphenylpyrrole (657 g., 3 mol.) was heated to boiling with pure dry dioxane (2.2 liters) and subjected to vigorous stirring under reflux. Heating was discontinued and potassium (128 g., 3 mol. + 10%) added at a rate so as to sustain vigorous refluxing. About 30 minutes were required for this addition and heat was then again applied to cause refluxing for a further 15 minutes.

The heating was discontinued and n-butyl iodide (580 g., 3 mol. + 5%) added slowly at a rate sufficient to cause refluxing. After the addition the butyl iodide was rinsed in with dioxane (50 cc.), the mixture refluxed for 15 minutes and then allowed to cool to 25°.

The potassium iodide formed was filtered off and washed on the filter with several small portions of dioxane (total 800 cc.) until the issuing filtrate was colourless. The total dioxane filtrate was then distilled from a steam-bath under vacuum to remove the solvent and the residual oil heated for 1-2 hours on the steam-bath under vacuum until no further boiling occurred. 1-butyl-2:4-diphenylpyrrole remained as a light orange, viscous liquid, the yield being 820–830 g. or 99–100%.

EXAMPLE 1

*Bis-2-(1-methyl-3:5-diphenylpyrrolo) trimethine cyanine perchlorate*

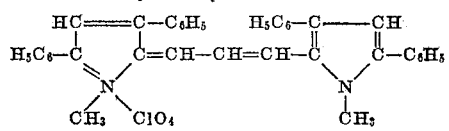

1-methyl-2:4-diphenylpyrrole (46.6 g.) was dissolved in warm ethanol (1 liter) and β-ethoxyacraldehyde diethylacetal (30 cc.) added. The mixture was stirred and 60% aqueous perchloric acid (30 cc.) slowly added. An intense green color immediately appeared and after warming on the steam-bath for 3 minutes, this changed to an intense green-blue color. After cooling, the bronze-colored crystals of dye which separated were filtered off. This dye is insoluble in water but soluble in alcohol and possesses an absorption maximum at 620 mμ. In solution in alcohol or other solvents it is bleached by all the normal photographic developers.

By replacing the 1-methyl-3,4-diphenylpyrrole used in the above example by a molecularly equivalent amount of 1-dodecyl-2,4-diphenylpyrrole (obtained as described above), bis-2-(1-dodecyl-3,5-diphenylpyrrolo) trimethinecyanine perchlorate having the following formula:

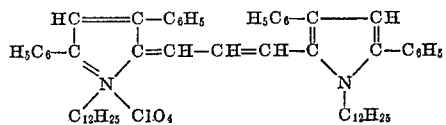

can be obtained.

EXAMPLE 2

*Sulfonated bis-2-(1-methyl-3:5-diphenylpyrrolo) trimethine cyanine perchlorate*

1-methyl-2:4-diphenylpyrrole (46.6 g.) was added slowly to 20% oleum (100 cc.) with cooling and stirring. The resulting solution of pyrrole sulphonic acid was then stirred into ethyl alcohol (1 liter). The temperature being kept at about 40° by cooling. To this solution stirred at 40°, 60% perchloric acid (50 cc.) was added, followed by β-ethoxy acraldehyde diethyl acetal (30 cc.). An intense green-blue dye was immediately produced and after 1 hour, the bronze-colored dye which separated was filtered off, washed with a little alcohol and dried. This dye contains free sulfonic acid groups, is soluble in water and is then rapidly bleached by photographic developers.

EXAMPLE 3

*Bis-2-(1-methyl-3:5-diphenylpyrrolo) pentamethine cyanine sulfate*

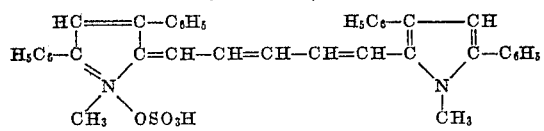

1-methyl-2:4-diphenylpyrrole (46.6 g.) was finely ground and suspended in methanol (50 cc.). Concentrated sulfuric acid (20 cc.) was added with stirring and cooling, and then sodium glutaconic dialdehyde (18 g.) added in portions. An intense green color was produced and after cooling in a freezing mixture, bronze crystals of the dye separated and were filtered off, washed with water and dried. This dye is insoluble in water but soluble in alcohol to give a solution having an absorption maximum at 750 mμ and which is bleached by photographic developers.

The sodium glutaconic dialdehyde may be replaced by acetyl glutaconic dialdehyde (16 g.) to give the same dye. Sulfuric acid may be replaced by other strong acids to give different dye anions.

By replacing the 1-methyl-2,4-diphenylpyrrole used in the above example by a molecularly equivalent amount of 1 - cyclohexyl-2,4-diphenylpyrrole, bis - 2 - (1 - cyclo - hexyl-3,5-diphenylpyrrolo) pentamethinecyanine sulfate represented by the following formula:

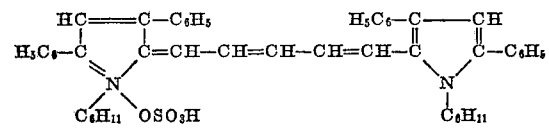

can be obtained.

EXAMPLE 4

*Sulfonated bis-2-(1-n-butyl-3:5-diphenylpyrrolo) trimethine cyanine perchlorate*

Concentrated (98%) sulfuric acid (800 cc.) was heated on a water-bath at 20°–25° with stirring and then 1-butyl-2:4-diphenylpyrrole (831 g. 3 mol.) was heated to 60° on a steam-bath and poured in a thin stream into the vigorously stirred acid, the temperature of the orange-brown solution being kept below 70° by regulating the rate of addition.

When the temperature has fallen to 40°, sulfonation is carried out by slowly adding 20% oleum over about 20 minutes, the temperature being maintained in the range 35–40°. It is believed that a dye containing 3 sulfonic acid groups is obtained by using 1000 cc. of oleum, 4 sulfonic acid groups using 1500 cc. oleum and 6 sulfonic acid groups per molecule by using 2000 cc. oleum. Stirring was continued until the solution had cooled to 25°.

Technical methanol (1 liter) was then very slowly added to the mixture so that the temperature did not rise above 40° and a further 4 liters of methanol were then added while maintaining the temperature of the mixture at 50°. When addition was complete, β-ethoxyacraldehyde diethylacetal (300 g., 1.5 mol. + 20%) was added over 10 minutes with vigorous stirring and after 30 minutes the methanol was distilled off under vacuum.

The dye solution was allowed to cool to 30° and then poured as a thin stream into a well stirred mixture of 60% perchloric acid (400 cc.) and water (10 liters) at 40° C. The dye was obtained on cooling, washed with water and dried. The yield of dye was 1160 g. or 83%.

The dye is very highly soluble in alcohol to give a blue solution having a wide absorption in the visible spectrum with a maximum at 590 m$\mu$. The dye containing 2 sulfonic acid groups is essentially insoluble in water and is inert photographically. It is very rapidly bleached in alcohol or other solution, by photographic developers.

EXAMPLE 5

*Sulfonated bis-2-(1-n-butyl-3:5-diphenylpyrrolo)-α-phenyl trimethine cyanine perchlorate*

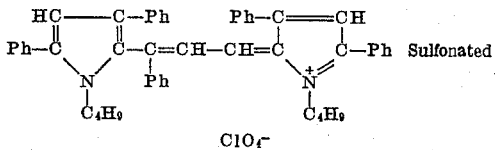

This dye is prepared in a similar manner to that described for the dye of Example 4, except that the β-ethoxyacraldehyde diethylacetal is replaced by an equivalent amount (346 g.) of phenylproparagyl aldehyde diethyl acetal. The dye is isolated in the same manner. It is insoluble in water, non-migratory, and inert in photographic emulsions. It is green absorbing in the blue and red regions of the spectrum and is bleached by developers.

EXAMPLE 6

*Bis-2-(1-ethyl-3:5-diphenylpyrrolo) trimethine cyanine perchlorate sulfonic acid*

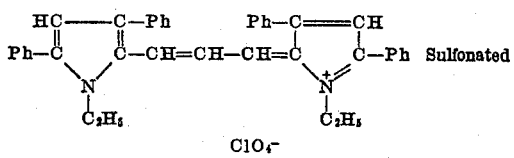

By replacing 1-butyl-2:4-diphenylpyrrole in Example 4 by the equivalent quantity of 1-ethyl-2:4-diphenylpyrrole (744 g.) the ethyl analogue is obtained. The dyes have absorption maxima at 595 m$\mu$, are bleached by developers and have slight to moderate desensitizing properties depending on the degree of sulfonation.

EXAMPLE 7

*Bis-2-(1-n-propyl-3:5-diphenylpyrrolo) trimethine cyanine perchlorate sulfonic acid*

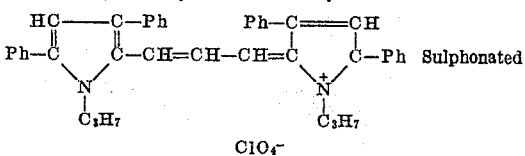

Similarly to Example 6 the n-propyl analogue is obtained by using 1-n-propyl-2:4-diphenylpyrrole (786 g.). The dye absorbs at 600 m$\mu$ and is rapidly bleached by developers. The desensitizing properties and diffusibility in photographic emulsions are intermediate between the dyes of Example 4 and Example 6.

EXAMPLE 8

*Bis-2-(1-butyl-3:5-diphenylpyrrolo)-pentamethine cyanine perchlorate trisulfonic acid*

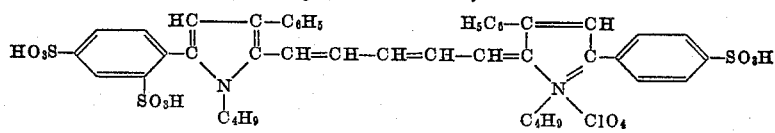

Concentrated (98%) sulfuric acid (800 cc.) and 1-butyl-2:4-diphenylpyrrole (831 g. 3 mol.) were reacted by pouring the latter compound in a thin stream into the vigorously stirred acid below 70°. When the temperature had fallen to 40°, sulfonation was carried out by slowly adding 20% oleum (1 liter), the temperature being maintained in the range 35–40°. Stirring was continued until the solution had cooled to 25°.

Technical methanol (1 liter) was then very slowly added to the mixture, keeping the temperature below 40°, and a further 4 liters of methanol were added at a rate so as to raise and maintain the temperature of the mixture to 50°. Sodium glutaconic dialdehyde (258 g.) was then added and the intense cyan dye solution stirred at 20° for a further 30 minutes. The methanol was distilled off under vacuum.

The cooled dye solution was poured into a well-stirred mixture of 60% perchloric acid (400 cc.) and water (10 liters) at 30°. The dye precipitated as a coarse solid and was then filtered off, washed with water and dried.

The dye was a dark blue powder, the yield being 950 g. This dye is practically insoluble in water but freely soluble in alcohol and some other organic solvents. It is rapidly bleached in solution by photographic developers and is inert and nonmigratory in photographic emulsions. It possesses a broad light absorption with a maximum at 700 m$\mu$.

EXAMPLE 9

*Bis-2-(1-methyl-3:5-diphenylpyrrolo)-α-phenyl trimethine cyanine perchlorate*

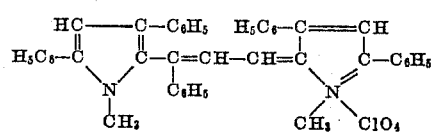

1-methyl-2:4-diphenylpyrrole (46.6 g.) is dissolved in ethanol (1250 cc.) and phenylpropargyl aldehyde diethylacetal (25 g.) is added. 60% perchloric acid (30 cc.) is added slowly with stirring to produce an intense bright green color. The mixture is heated on the steam-bath for 10 minutes and then cooled to room temperature. After filtering the dye is washed with ethanol (3×100 cc.) and then ether (3×100 cc.). The yield is 17 g. or 25%. This dye is inert and non-diffusing in emulsions and solutions in organic solvents are bleached by developers.

EXAMPLE 10

*Bis-2-(1-methyl-3:5-diphenylpyrrolo) mono-methine cyanine perchlorate*

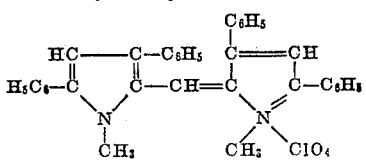

1-methyl-2:4-diphenylpyrrole (4.6 g. 1/50 mol.) and 90% formic acid (20 cc.) were heated together at 100° C. for ½-hour, cooled to 20° and perchloric acid (2.5 cc.) added. The solution was poured into iced water and the solid filtered off. The dye was recrystallised from methanol as a blue solid, M. P. 100.5° C. Yield 4.3 g. or 75%. It is soluble in solvents such as acetone and alcohol to give a blue solution which is bleached by photographic developers.

EXAMPLE 11

*Bis-2-(1-methyl-3:5-diphenylpyrrolo) trimethine cyanine perchlorate*

This dye was also obtained by replacing the β-ethoxy acraldehyde diethyl acetal used in Example 1 by propargyl aldehyde (6 g.). The yield of dye was 25 g.

What I claim as my invention and desire secured by Letters Patent of the United States is:

1. A cyanine dye selected from the group consisting of bis-2-(1-methyl-3:5-diphenylpyrrolo) trimethine cyanine perchlorate; bis-2-(1-methyl-3:5-diphenylpyrrolo) pentamethine cyanine sulfate; bis-2-(1-methyl-3:5-diphenylpyrrolo)-α-phenyltrimethine cyanine perchlorate; bis-2-(1-methyl-3:5-diphenylpyrrolo) mono-methine cyanine perchlorate; and bis-2-(1-butyl-3:5-diphenylpyrrolo)-pentamethine cyanine perchlorate trisulfonic acid.

2. The cyanine dye represented by the following formula:

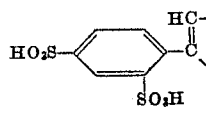

3. The cyanine dye represented by the following formula:

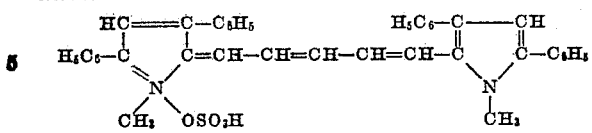

4. The cyanine dye represented by the following formula:

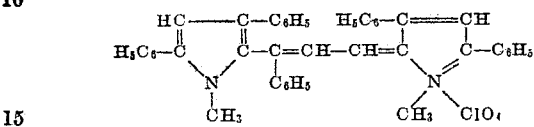

5. The cyanine dye represented by the following formula:

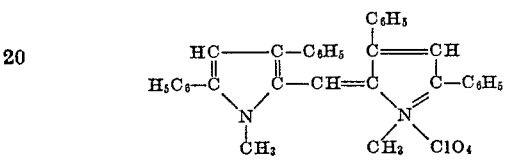

6. The cyanine dye represented by the following formula:

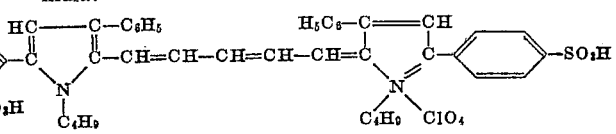

References Cited in the file of this patent

UNITED STATES PATENTS

| | | |
|---|---|---|
| 2,104,064 | Zeh | Jan. 4, 1938 |
| 2,131,853 | Dieterte | Oct. 4, 1938 |

FOREIGN PATENTS

| | | |
|---|---|---|
| 529,440 | Great Britain | 1940 |
| 562,754 | Great Britain | 1944 |

OTHER REFERENCES

Rogers: Chem. Soc. J., pp. 596–97 (1943).

Brooker: J. Amer. Chem. Soc. (1945), vol. 67, pp. 1869–74.